(12) United States Patent
Orsat

(10) Patent No.: US 7,207,217 B2
(45) Date of Patent: Apr. 24, 2007

(54) MOVEMENT DETECTING DEVICE AND SAFETY DEVICE FOR AWNING WITH ARTICULATED ARMS

(75) Inventor: Jean-Michel Orsat, Châtillon-sur-Cluses (FR)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 10/332,076

(22) PCT Filed: Jul. 4, 2001

(86) PCT No.: PCT/IB01/01193

§ 371 (c)(1), (2), (4) Date: Jan. 2, 2003

(87) PCT Pub. No.: WO02/04960

PCT Pub. Date: Jan. 17, 2002

(65) Prior Publication Data

US 2004/0031321 A1   Feb. 19, 2004

(30) Foreign Application Priority Data

Jul. 7, 2000 (FR) .................... 00 08932

(51) Int. Cl.
*G01P 13/00* (2006.01)
(52) U.S. Cl. ................................... 73/170.01
(58) Field of Classification Search . 73/170.01–170.15
See application file for complete search history.

(56) References Cited

U.S. PATENT DOCUMENTS 4,930,243 A * 6/1990 Lowe et al. .................... 43/17
6,392,584 B1 * 5/2002 Eklund ........................ 341/183

FOREIGN PATENT DOCUMENTS

| DE | 44 07 342 A | 11/1994 |
| DE | 20 00 682 | 3/2000 |
| EP | 0 771 929 A | 5/1997 |
| GB | 1261155 | 1/1972 |

* cited by examiner

*Primary Examiner*—Edward Lefkowitz
*Assistant Examiner*—Jermaine Jenkins
(74) *Attorney, Agent, or Firm*—Frommer Lawrence & Haug LLP; Ronald R. Santucci

(57) ABSTRACT

The device for detecting movement, particularly that due to wind, comprises a sensor (15) supplying a signal at the time of detection and processing means (21, 22, 23) for converting the detected signal into a control signal. The signal supplied by the sensor (15) is used as an alarm signal for the processing means (21, 22, 23).

13 Claims, 2 Drawing Sheets

MOVEMENT DETECTING DEVICE AND SAFETY DEVICE FOR AWNING WITH ARTICULATED ARMS

This application is a 371 of PCT/IB01/01193 filed Jul. 4, 2001 and published on Jan. 17, 2002 under publication number WO 02/04960 A and claims priority benefits of French Patent Application No. 0008932 filed Jul. 7, 2000.

BACKGROUND OF THE INVENTION

The invention relates to a device for detecting movement, particularly that due to wind, comprising a sensor supplying a signal at the time of detection and processing means for converting the detected signal into a control signal.

The invention also relates to a safety device for protecting an awning with arms from the effects of wind, said awning comprising a support carrying a rolling spindle, an end bar, arms connecting the support and the bar in an articulated manner, a sheet fixed at one end to the spindle and at the other end to the bar in such a way as to allow its rolling on the spindle or its unrolling from the spindle by actuating means and detection means whose detected signal makes it possible to command a displacement of the sheet via actuating means after comparison with a setting.

Finally, the invention relates to a control method for such a safety device.

Safety devices for awnings with arms are known in the prior art.

A first system is described in the utility model DE 200 00 682. In this system, the detection means are placed at the end of the awning. However, this device has disadvantages: as the sensor section is distant from the controlling part of the awning and as, in order to simplify matters, a transmitter and receiver system is used instead of cables, the sensor section must transmit as briefly as possible in order to economize the use of its own energy source. According to this utility model, provision is made for using the receiver of the command for sending an acknowledgement signal to the transmitter of the sensor and in this way stop the transmission of the signal. In this system, the transmitter must not only be capable of transmitting a signal, but also of receiving a signal and of executing it.

This solution however complicates the known system and also makes it more expensive to produce.

The publication DE 44 07 342 describes another system in which the tension applied by the wind to the sheet is transmitted to a sensor integral with the rolling spindle of the blind. In this system, the sensor is placed beside the control of the blind such that the problems of data transmission and power supply for the blind do not arise.

A third system is described in the publications EP 0 771 929. This document relates to a control installation for a sun protection component comprising a sensor equipped with an anemometer driving a dynamo supplying a current representative of the force of the wind and a radio transmitter. Provision is made for using a portion of the current supplied by the dynamo for the power supply of the sensor. Associated with the sensor are means of processing the data supplied by the sensors in such a way that the transmitter does not need to transmit raw data from the probes continually.

SUMMARY OF THE INVENTION

The purpose of the invention is to improve the known devices by overcoming the disadvantages of the prior art.

The detection device according to the invention is one in which the signal supplied by the sensor is used as a wake-up signal for the processing means.

One of the advantages of the system according to the invention is its great simplicity in comparison with the existing systems. Furthermore, as it is the signal supplied by the detector which acts as a wake-up signal for the device, energy losses are minimized: only an actual detection of movement by the sensor results in the activation of the processing means. Finally, in this way the number of components necessary for the functioning of the device is reduced.

According to a first embodiment, the sensor comprises an accelerometer capable of producing an electrical signal under the effect of vibrations.

According to a first variant, the sensor is a piezo-electric sensor with a polymer membrane held in a frame and comprising an inertia weight, preferably placed substantially at its center.

According to another variant, the sensor is an electromagnetic sensor with a magnetized inertia weight moving inside a solenoid.

According to a particular embodiment, the processing means comprises at least a wake-up circuit, a circuit for shaping the detected signal, an analysis and control circuit connected to said shaping circuit and power supply means, the detected signal being supplied to the wake-up circuit and to the shaping circuit.

According to another embodiment, the device comprises a timing device to cut off the power supply of the processing means after a specified time.

The safety device for protection from the effects of wind is one in which said detection means are formed by a detection device according to the invention.

According to a first embodiment of the safety device, the detection means are placed on the end bar of the awning.

The analysis and control circuit can comprise at least one converter and one logic processing unit comparing the detected signal with a setting and commanding the displacement of the sheet according to the result of the comparison by transmitting a command to the actuating means.

A transmitter is preferably associated with the analysis and control circuit in order to send the sheet displacement command instruction and, in a corresponding manner, a receiver is associated with the actuating means in order to receive the command transmitted by the transmitter.

The control method according to the invention comprises at least the following steps:

a) a displacement of the bar is detected;
b) the detected displacement is converted into a signal;
c) the power supply of the detection means is brought into effect by means of said signal;
d) said signal is compared with a setting;
e) the retraction of the sheet of the awning is commanded according to the result of the comparison of said signal with the setting.

The signal and the setting correspond to values 10 of intensity and/or of frequency.

According to a particular variant, it is possible to cut off the power supply of the detection means after the sheet retraction command.

According to another particular variant, the power supply of the detection means is cut off if no displacement is detected over a predetermined time.

The invention will be better understood from the description of an embodiment of the invention and from the figures relating thereto.

DESCRIPTION OF THE PREFERRED EMBODIMENTS

Figure 1:
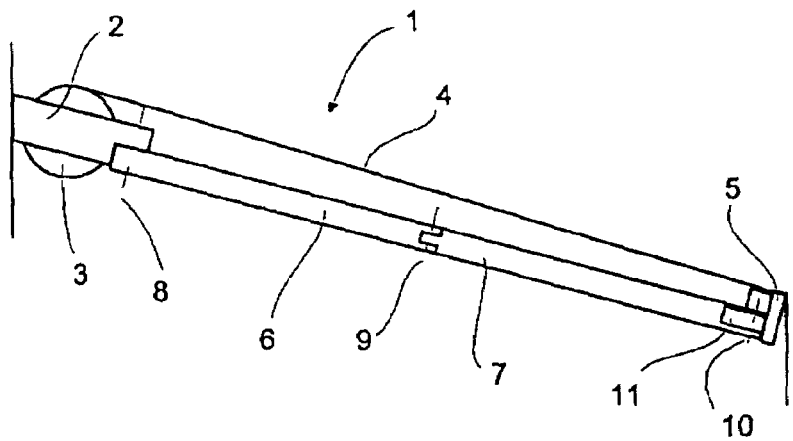
FIG. 1 is a general diagram of a safety device according to the invention.

According to FIG. 1, the safety device of the awning with arms 1 comprises a support 2, mounted on a fixed point, such as for example a wall of a house (not shown), said support 2 carrying, on the one hand, a rolling up tube 3 driven by a motor (not shown) and on which a sheet is rolled up, an end bar 5 which is connected to the support 2 by the intermediary of articulated arms.

The articulated arms comprise two segments 6, 7, the first segment 6 being fixed at one of its ends to the support 2 by the intermediary of a first spindle 8, and at its other end to one of the ends of the second segments 7 by the intermediary of a second spindle 9. As regards the other end of the second segment 7, this is connected to the end bar 5 by the intermediary of a third spindle 10.

The sheet 4 is fixed at one end to the rolling up tube 3 and at the other end to the end bar 5 in such a way as to allow its rolling up on the rolling up tube 3 or its unrolling from said tube 3 by actuating means, such as for example a motor. In FIG. 1, the sheet 4 is shown in its unrolled state.

The safety device furthermore comprises a detection device 11 which is placed on the end bar 5. This detection device allows a direct detection of the vibrations that actually occur at the level of the bar 5, in particular under the effect of wind. This place is particularly advantageous because of its exposure: in the case of an unrolled awning, it is at this place that the displacements due to the effect of wind will be largest, because of the cantilever created by a partially or fully unrolled awning. The value measured at this place will therefore make it possible to control the rolling up of the sheet 4 appropriately, in particular if the force of the wind exceeds a predetermined value.

Figure 2:
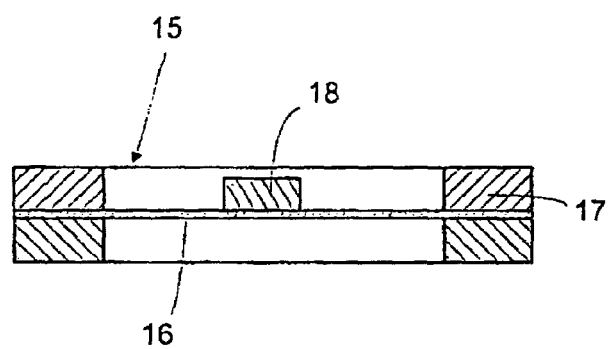
FIG. 2 shows an embodiment of a sensor with a piezo-electric membrane.
Figure 3:
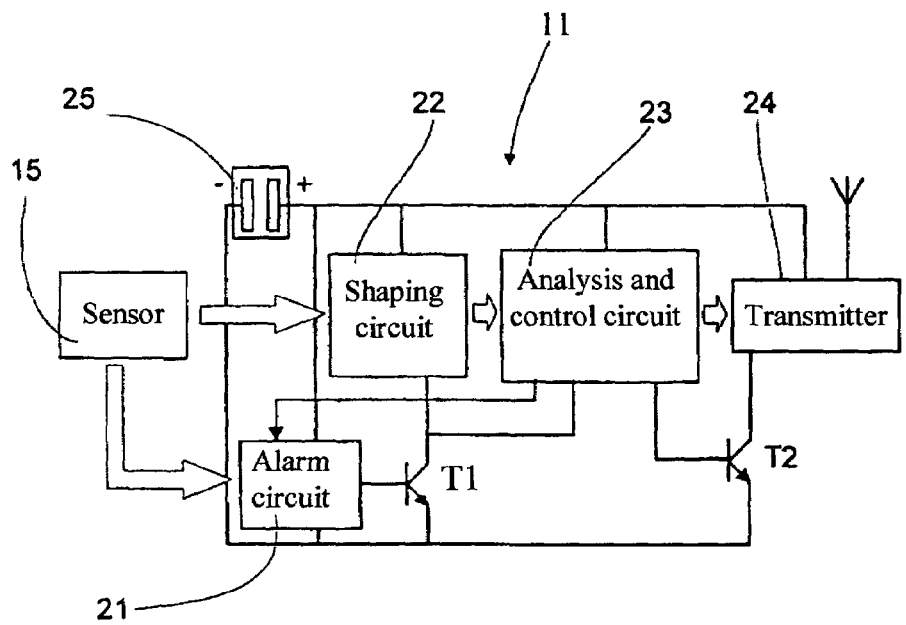
FIG. 3 shows an embodiment of a circuit used as a processing means in the movement detection device.

An embodiment of the detection device according to the invention is described with references in FIGS. 2 and 3. In this embodiment, the detection device is formed by a sensor 15 of the accelerometer type and capable of producing electrical energy under the effect of vibrations. In the embodiment shown in FIG. 2, the sensor 15 uses a piezo-electric principle and comprises a polymer membrane 16, such as that manufactured by the company Piezo-Tech, held in a frame 17 and supporting an inertia weight 18. Preferably, the inertia weight 18 is placed at the center of membrane 16. Thus, in the presence of vibrations on the bar 5, this inertia weight 18 distorts the piezo-electric polymer membrane 16 which, because of this, generates a proportional electrical potential variation which can be used both for waking-up the movement detection device and for determining the command to be executed at the rolling-up tube.

According to another variant, it is possible to use a sensor operating according to an electromagnetic principle, comprising for example a magnetized core which moves inside a solenoid which also makes it possible to generate an electrical signal when the sensor is subjected to vibrations.

An embodiment of the movement detection device is shown by way of example in FIG. 3.

The electrical signal transmitted by the sensor 15 has two functions as mentioned above. On the one hand, it is used for actuating a wake-up circuit 21 via, for example, a trigger formed by the transistor T1. When an electrical signal is generated by the sensor 15, that is to say as soon as the bar 5 is subjected to a vibration for example under the effect of wind, the transistor T1 conducts and powers the shaping circuits 22 and the analysis and control circuit 23 by activation of the battery 25. The electrical signal generated by the sensor 15 is then also used in the shaping circuits 22 and analysis and control circuits 23 mentioned above for determining the effective control of the awning. The value of the signal transmitted by the sensor 15 is compared with a predetermined reference setting and, in accordance with the result of this comparison, a command is decided in the analysis and control circuit 23. This command is then transmitted to the transmitter 24 in order to be sent to a corresponding receiver (not shown) which is located for example at the rolling-up tube 3. This receiver then commands in an appropriate manner: for example a rolling-up of the awning if the detected force of the wind exceeds the predetermined setting value. The transmitter 24 and the receiver used are means known to those skilled in the art and are conventional in the prior art for the remote control of a rolling up or an unrolling of an awning.

Figure 4:
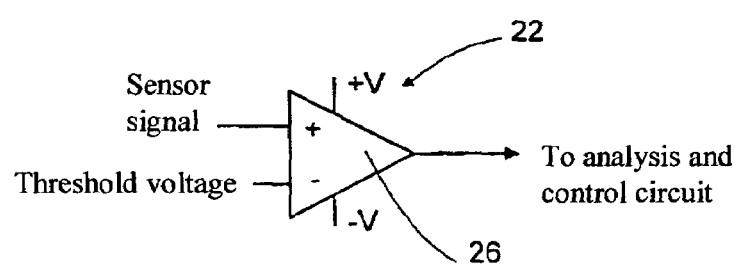
FIG. 4 shows an embodiment of a shaping circuit.

An embodiment of the shaping circuit 22 is shown in FIG. 4. This circuit 22 comprises a comparator 26 which conditions the signal voltage of the sensor 15 between the extreme voltages −V and +V, whilst retaining the information relating to the frequency of the detected signal. It makes it possible to convert the detected energy into a signal representative of the force of the wind which is usable by the analysis and control circuit 23.

Figure 5:
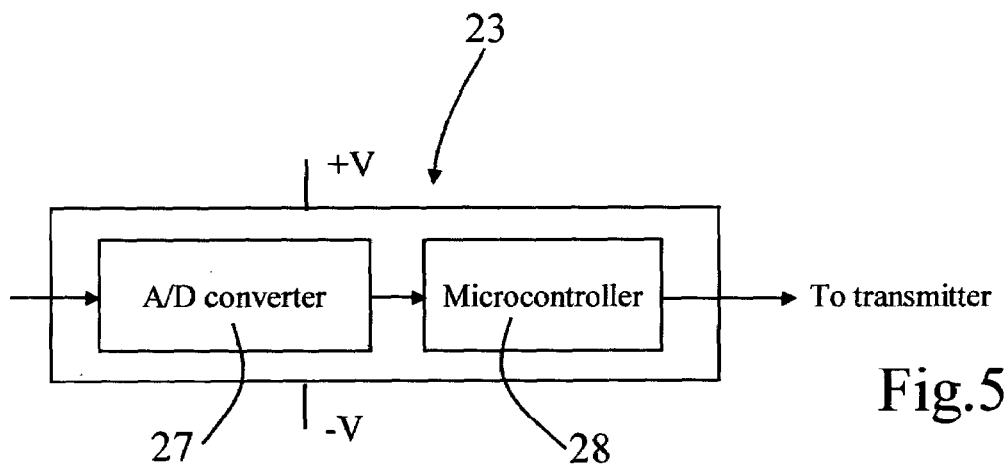
FIG. 5 shows an analysis and control circuit.

The signal coming from this circuit 22 is then transmitted to the analysis and control circuit 23, as shown in FIG. 3. An embodiment of this circuit 23 is shown diagrammatically in FIG. 5. The signal coming from the circuit 22 is firstly converted by an analog-digital converter 27 and is applied as an input to a microcontroller 28, such as for example a logic processing unit (LPU), as known in the prior art. This microcontroller 28 contains in memory at least one predetermined setting and comprises an arithmetic and logic unit which makes the comparison between the signal received from the converter and the stored predetermined setting. In the case of exceeding the setting, the circuit 23 commands the transistor T2 (see FIG. 3) which provides the power supply of the transmitter 24. The latter then transmits a command to retract the sheet 4 of the awning. Once the retraction command has been transmitted, the circuit 23 can transmit another command to the wake-up circuit 21 in order to suspend the command of the transistor T1 and because of this cut off the power supply of the detection device 11.

Figure 6:
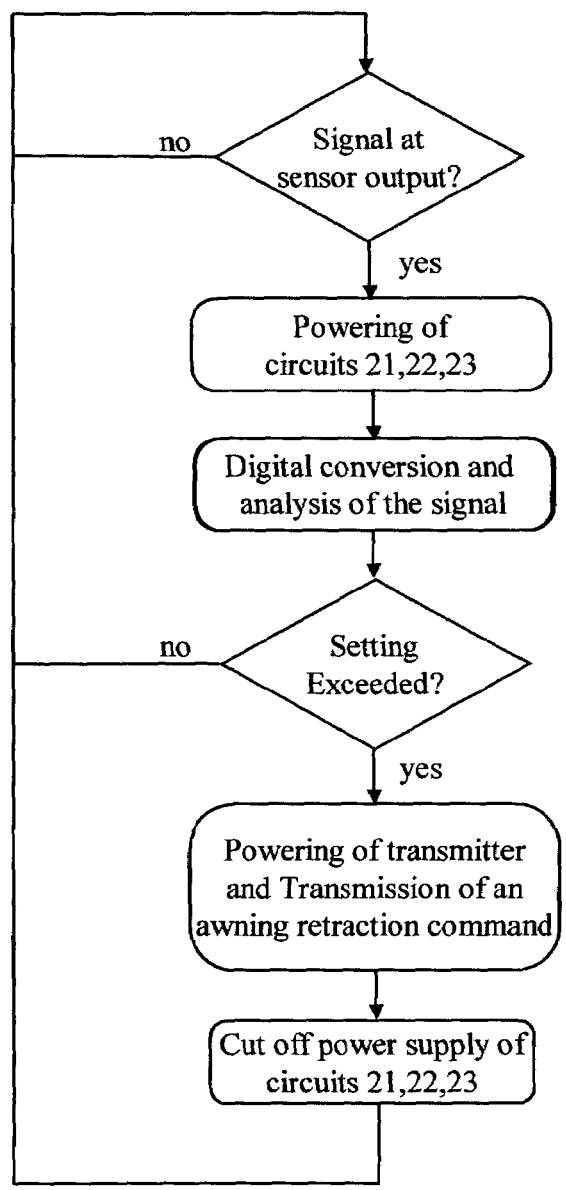
FIG. 6 is a block diagram illustrating the method of control of the safety device according to the invention.

The block diagram of FIG. 6 illustrates a control method for a safety device according to the invention.

As long as no signal is detected at the output of the sensor 15 ("Signal at sensor output?"), nothing happens and the circuit 20 is not powered. As soon as a signal is transmitted by the sensor 15, the circuits 21, 22 and 23 are powered ("Powering of circuits 21, 22, 23"). The next step comprises the shaping and conversion of the signal into a signal that can be used for comparison with the setting ("Digital conversion and analysis of the signal") in the microcontroller and said comparison ("Setting exceeded?"). If the comparison results in an exceeding of the stored setting ("Setting exceeded=yes"), the transmitter 24 is powered and a command for retracting the sheet 4 of the awning is sent ("Powering of transmitter and Transmission of an awning retraction command?"). The power supply of the circuits 21, 22 and 23 is then cut off (Cut off power supply of circuits 21, 22, 23") and the circuits returns to the standby mode waiting for the detection of a signal.

If on the other hand, the setting is not exceeded ("Setting exceeded=no") the circuit remains active and continues to measure the signal received by the sensor 15 and to compare it with the setting stored in the analysis and control circuit 23. For this situation, if necessary it is possible to provide a timing device which cuts off the power supply of the circuits 21, 22 and 23 if no more values are detected at the output of the sensor 15 after a certain time, in the case, for example, of a slight gust of wind whose effectively detected value is less than that of the setting. This timing device can be integrated in the wake-up circuit 21.

The embodiment of the inventions are described by way of example and variations within the scope of the claimed protection are possible. For example, the stored setting can not only be a value of intensity but can also relate to frequency. Thus, not only could the detected value of the intensity of the wind be used but also the frequency of the vibration generated on the end bar 5 to command a retraction of the sheet 4 of the awning.

Other means equivalent to those claimed can also be envisaged. For example, as means of detection, it is possible to use an optical system of which one part is fixed to the end bar of the awning and another part is mounted on a fixed point, for example the wall bearing the awning. In this way, it is also possible to detect the effective movements of the end bar and to command the retraction of the awning in an appropriate manner if the movements of the bar are too great and exceed a predetermined setting.

The means of transmission between transmitter 24 and receiver can be of different nature. It is possible to use radio waves or other equivalent means such as optical or acoustic means.

Although illustrative embodiments of the invention have been shown and described, a wide range of modification, change and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

The invention claimed is:

1. A device for detecting movement, particularly that due to wind, comprising a detection means for detecting movement comprising a sensor (15) supplying a signal at the time of detection and processing means (21, 22, 23, 25) for converting the detected signal into a control signal, wherein the signal supplied by the sensor (15) is used as a wake-up for the processing means (21, 22, 23, 25);
wherein said processing means comprises at least a wake-up circuit (21), a circuit (22) for shaping the detected signal, an analysis and control circuit (23) connected to said shaping circuit (22) and power supply means (25), the detected signal being supplied to said circuit (21) and to said shaping circuit (22).

2. The device as claimed in claim 1, wherein the sensor (15) comprises an accelerometer capable of producing an electrical signal under the effect of vibrations.

3. The device as claimed in claim 2, wherein the sensor (15) is a piezo-electric sensor with a polymer membrane (16) held in a frame (17) and comprising a core (18).

4. The device as claimed in claim 2, wherein the sensor is an electromagnetic sensor with a magnetized core moving inside a solenoid.

5. The device as claimed in claim 1, wherein it comprises a timing device to cut off the power supply of the processing means after a specified time.

6. A safety device for protecting an awning with arms (1) from the effects of wind, said awning (1) comprising a support (2) carrying a rolling spindle (3), an end bar (5), arms (6, 7) connecting the support (2) and the bar (5) in an articulated manner, a sheet (4) fixed at one end to the spindle (3) and at the other end to the bar (5) in such a way as to allow its rolling up on the spindle (3) or its unrolling from the spindle (3) by actuating means and detection means (11) whose detected signal makes it possible to control a displacement of the sheet (4) via actuating means after comparison with a setting, wherein said detection means (11) are formed by a detection device for detecting movement, particularly that due to wind, comprising a sensor (15) supplying a signal at the time of detection and processing means (21, 22, 23, 25) for converting the detected signal into a control signal, wherein the signal supplied by the sensor (15) is used as a wake-up for the processing means (21, 22, 23, 25).

7. The safety device as claimed in claim 6, wherein said detection means (11) are placed on the end bar (5) of the awning.

8. The safety device as claimed in claim 6, wherein the analysis and control circuit (23) comprises at least one converter and one logic processing unit (LPU, 28) comparing the detected signal with a setting and commanding the displacement of the sheet (4) according to the result of the comparison by transmitting a command to the actuating means.

9. The safety device as claimed in claim 6, wherein a transmitter (24) is associated with the analysis and control circuit in order to send the sheet (4) displacement command instruction and a receiver is associated with the actuating means in order to receive the command transmitted by the transmitter (24).

10. A control method for a safety device for protecting an awning with arms from the effects of wind, said awning comprising at least one support carrying a rolling spindle, an end bar, arms connecting the support and the bar in an articulated manner, a sheet fixed at one end to the spindle and at the other end to the bar in such a way as to allow its rolling up on the spindle or its unrolling from the spindle by actuating means and means of detection of the effects of the wind on the awning placed on the end bar, comprising the following steps:
a) a displacement of the bar is detected;
b) the detected displacement is converted into a signal;
c) the power supply of the detection means is brought into effect by means of said signal;
d) said signal is compared with a setting;
e) the retraction of the sheet of the awning is commanded according to the result of the comparison of said signal with the setting.

11. The method as claimed in claim 10, wherein said signal and said setting correspond to values of intensity and/or of frequency.

12. The method as claimed in claim 10, wherein the power supply of the detection means is cut off after the sheet retraction command.

13. The method as claimed in claim 10, wherein the power supply of the detection means is cut off if no displacement is detected over a predetermined time.

* * * * *